Figure 1:
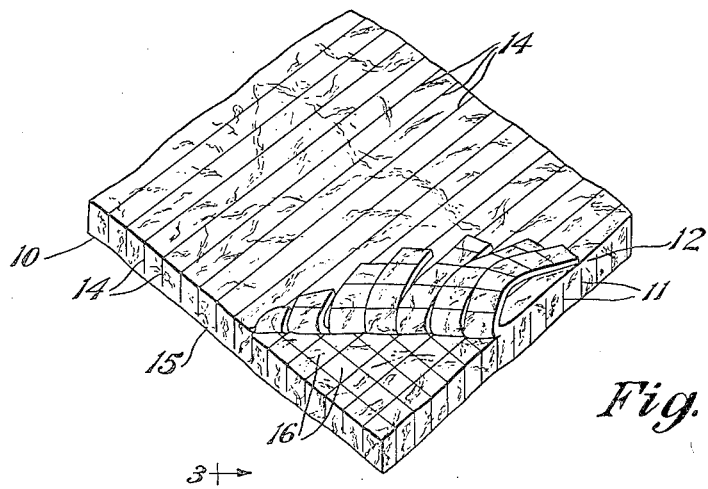

June 30, 1936.   A. J. GURNEY   2,046,118
TENDERED STEAK AND METHOD OF TENDERING THE SAME
Filed July 14, 1933

Inventor
A. J. Gurney
By Freas and Bishop
Attorneys

Patented June 30, 1936

2,046,118

UNITED STATES PATENT OFFICE 2,046,118

TENDERED STEAK AND METHOD OF TENDERING THE SAME

Albert J. Gurney, Canton, Ohio, assignor to The American Mine Door Company, Canton, Ohio, a corporation of Ohio Application July 14, 1933, Serial No. 680,402

6 Claims. (Cl. 17—45)

The invention relates to the tendering of steaks, and similar cuts of meat, in order to sever the fibers and open the tissues of the meat so that the same may be made tender and juicy when broiled, fried or otherwise cooked.

As is well known, the flesh of animals is composed of tissues and fibers which bind the tissues together, making the meat tough and hard to chew when broiled, fried or otherwise cooked. These tissues and fibers become tougher in some parts of the meat than in others, so that such cuts cannot be used for broiling or frying.

Various methods have been employed for making meats tender preparatory to cooking the same, such as pounding the meat, or cutting or slicing into one surface thereof with a series of cuts located at angles to each other as in the preparation of flank steaks, diced or cubed steaks and the like. Pounding, however, opens the cells of the tissues and permits the juices to escape, causing the meat to be dry and unpalatable when broiled or fried. Cutting or slicing into one surface only of the meat does not open the meat entirely through so as to permit the cooking fats and steam to circulate entirely through the meat and, furthermore, causes the meat to curl when fried or broiled, this curling becoming excessive unless the meat is first cooked upon the cut surface.

The object of the present improvement is to provide a method of rendering steaks and similar cuts of meat tender by cutting into the tissues and fibers on both sides of the meat, so as to open the meat entirely through and permit frying fats and steam to pass entirely through the meat without permitting the juices to escape therefrom.

The above and other objects which will be apparent from the accompanying drawing and following description, or which may be later referred to, may be attained by producing a plurality of uniform parallel cuts of uniform depth through one surface of a steak or the like to a point near the opposite surface and then producing similar cuts in the other surface of the meat and at right angles to the first cuts, whereby a multiplicity of diced sections is produced within the interior of the steak and held together by thin membranes of meat, one on the top and one on the bottom of the steak, each sliced in one direction, opening the meat all the way through at every point where the cuts cross each other, giving the frying fats and steam free circulation throughout the entire piece of meat regardless of which side is placed in the frying pan or toward the heating element, searing the meat quickly and retaining the juices therein so as to produce a tender, juicy, palatable steak.

Figure 2:
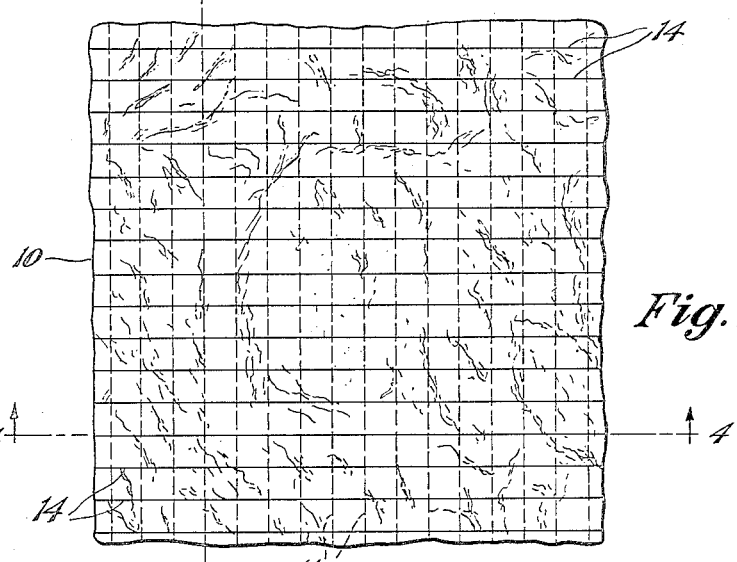
Figure 3:

An embodiment of the invention thus set forth in general terms is illustrated in the accompanying drawing, in which Figure 1 is a perspective view of a piece of steak prepared in accordance with the invention, a part being cut away for the purpose of illustrating the interior;

Fig. 2, a top plan view of the steak as shown in Fig. 1;

Fig. 3, a section on the line 3—3, Fig. 2; and

Figure 4:
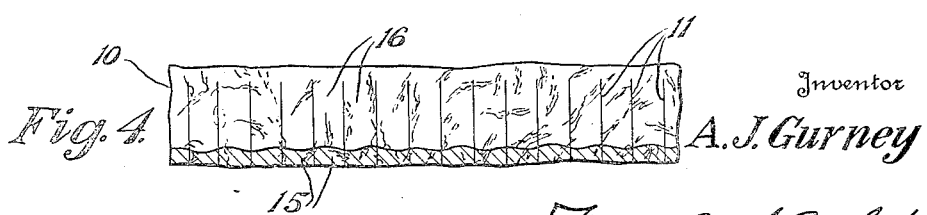

Fig. 4, a section on the line 4—4, Fig. 2.

Similar numerals refer to similar parts throughout the drawing.

The method may be carried out with the use of a machine comprising a plurality of spaced cutting disks or knives such for instance as shown in my copending application Serial No. 626,274, filed July 30, 1932.

In practicing the invention a piece of steak or other meat as indicated generally at 10 is cut to a uniform depth through one surface to a point near the opposite surface with a plurality of spaced parallel cuts such as indicated at 11. These cuts are uniformly spaced and all of substantially the same depth and arranged as shown in the drawing, leaving a relatively thin membrane 12 at the opposite surface of the steak.

A similar series of cuts 14 is then made through the opposite surface of the steak, preferably at right angles to the cuts 11 and extending to a point near the other side of the steak, leaving a thin membrane 15 similar to the membrane 12.

At every point where the cuts 11 and 14 cross each other, the meat is opened through the entire thickness of the steak and a plurality of substantially cubic or diced sections 16 are produced. By slicing beneath the top membrane (or above the bottom membrane) as shown in Fig. 1, and turning the membrane back, these square or cubic sections are seen. It is thus obvious that the steak although cut only in one direction through each surface, is opened up throughout the entire inner portion of the steak, producing what might be termed a latticed steak, the meat being opened up all the way through at every point where the cuts cross each other, permitting free circulation of the frying fats and steam throughout the entire piece of meat so as to sear it quickly while at the same time retaining the juices when fried or broiled.

The steak cut in this manner will cook very rapidly, it being only necessary to broil or fry the same one minute on each side in order to completely cook the steak and such a steak will not curl up regardless of which side is cooked first. Steaks which are cut only on one side such as is common practice at present, will curl up when placed in the skillet or broiler unless they are first cooked upon the cut side.

By cutting the steak in the manner above described it is not only made more tender but more palatable since only the interior portion of the steak is entirely separated into cubes or squares, thus retaining the juices much more effectively than where all of the cutting is done upon one side of the steak.

I claim:

1. The method of tendering a steak and the like which consists in placing a plurality of spaced continuous cuts of uniform depth through one side of the steak and extending more than halfway through the thickness thereof and placing a plurality of similar cuts through the opposite side of the steak and extending more than halfway through the thickness thereof and at an angle to the first named cuts.

2. The method of tendering a steak and the like which consists in placing a plurality of uniformly spaced continuous cuts of uniform depth through one side of the steak and extending more than halfway through the thickness thereof and placing a plurality of similar cuts through the opposite side of the steak and extending more than halfway through the thickness thereof and at right angles to the first named cuts.

3. The method of tendering a steak and the like which consists in placing a plurality of spaced continuous cuts of uniform depth through one side of the steak to a point near the opposite side, and placing a plurality of similar cuts through said opposite side of the steak and at an angle to the first named cuts, whereby the entire interior portion of the steak is opened up by the first named cuts crossing the second named cuts.

4. The method of tendering a steak and the like which consists in placing a plurality of uniformly spaced continuous cuts of uniform depth through one side of the steak to a point near the opposite side, and placing a plurality of similar cuts through said opposite side of the steak and at right angles to the first named cuts, whereby the entire interior portion of the steak is cut into sections of substantially cubical form by the first named cuts crossing the second named cuts.

5. A steak and the like having a plurality of parallel continuous cuts of uniform depth through one side to a point near the opposite side, and a similar plurality of cuts through the other side of the steak and at an angle to the first named cuts, whereby the entire interior portion of the steak is opened up by the first named cuts crossing the second named cuts.

6. A steak and the like having a plurality of parallel continuous cuts of uniform depth through one side to a point near the opposite side, and a similar plurality of cuts through the other side of the steak and at right angles to the first named cuts, whereby the entire interior portion of the steak is cut into cubes by the first named cuts crossing the second named cuts.

ALBERT J. GURNEY.